United States Patent [19]
Kumada et al.

[11] Patent Number: 5,457,549
[45] Date of Patent: Oct. 10, 1995

[54] METHOD AND APPARATUS FOR ENHANCING THE SPEED OF COLOR IMAGE PROCESSING

[75] Inventors: Shuichi Kumada; Takatoshi Ohta, both of Yokohama, Japan

[73] Assignee: Canon Kabushiki Kaisha, Tokyo, Japan

[21] Appl. No.: 380,938

[22] Filed: Jan. 31, 1995

Related U.S. Application Data

[63] Continuation of Ser. No. 181,167, Jan. 13, 1994, abandoned, which is a continuation of Ser. No. 664,783, Mar. 5, 1991, abandoned.

[30] Foreign Application Priority Data

Mar. 6, 1990 [JP] Japan ......................... 2-52651
Jun. 21, 1990 [JP] Japan ......................... 2-161389

[51] Int. Cl.⁶ ............................................. H04N 1/46
[52] U.S. Cl. .............................. 358/530; 358/518
[58] Field of Search ........................ 382/54; 358/518, 358/521, 529, 530

[56] References Cited

U.S. PATENT DOCUMENTS

| | | | |
|---|---|---|---|
| 4,418,358 | 11/1983 | Poetsch et al. | 358/80 |
| 4,862,255 | 8/1989 | Takanashi et al. | 358/80 |
| 4,893,180 | 1/1990 | Shigaki et al. | 358/80 |
| 4,930,007 | 5/1990 | Sugiura et al. | 358/75 |
| 4,958,219 | 9/1990 | Kadowaki | 358/75 |
| 4,974,067 | 11/1990 | Suzuki et al. | 358/458 |
| 4,989,079 | 1/1991 | Ito | 358/80 |
| 5,003,326 | 3/1991 | Suzuki et al. | 358/80 |
| 5,126,838 | 6/1992 | Ohsawa et al. | 358/75 |

FOREIGN PATENT DOCUMENTS

| | | | |
|---|---|---|---|
| 323265 | 7/1989 | European Pat. Off. | H04N 1/46 |
| 3417188 | 11/1984 | Germany | H04N 1/46 |

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

The present invention relates to an image processing apparatus and method and, more particularly to a technique which controls color correction in accordance with the features of an input image. Especially when the input image is a specific value, the present invention speeds up the process, and improves the color reproducibility without performing color correction.

33 Claims, 12 Drawing Sheets

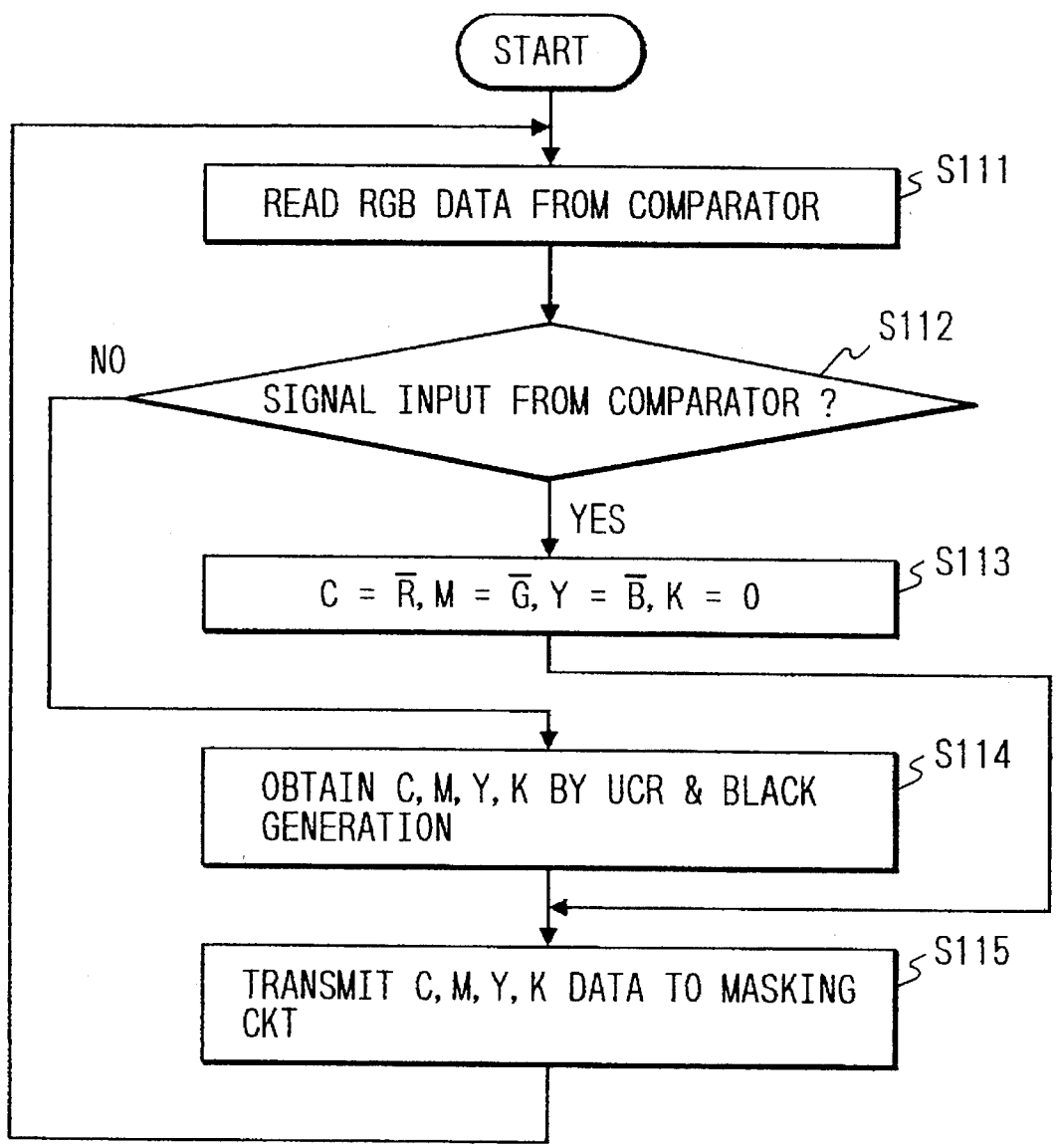

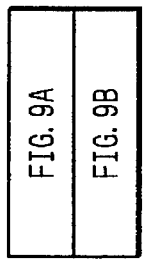
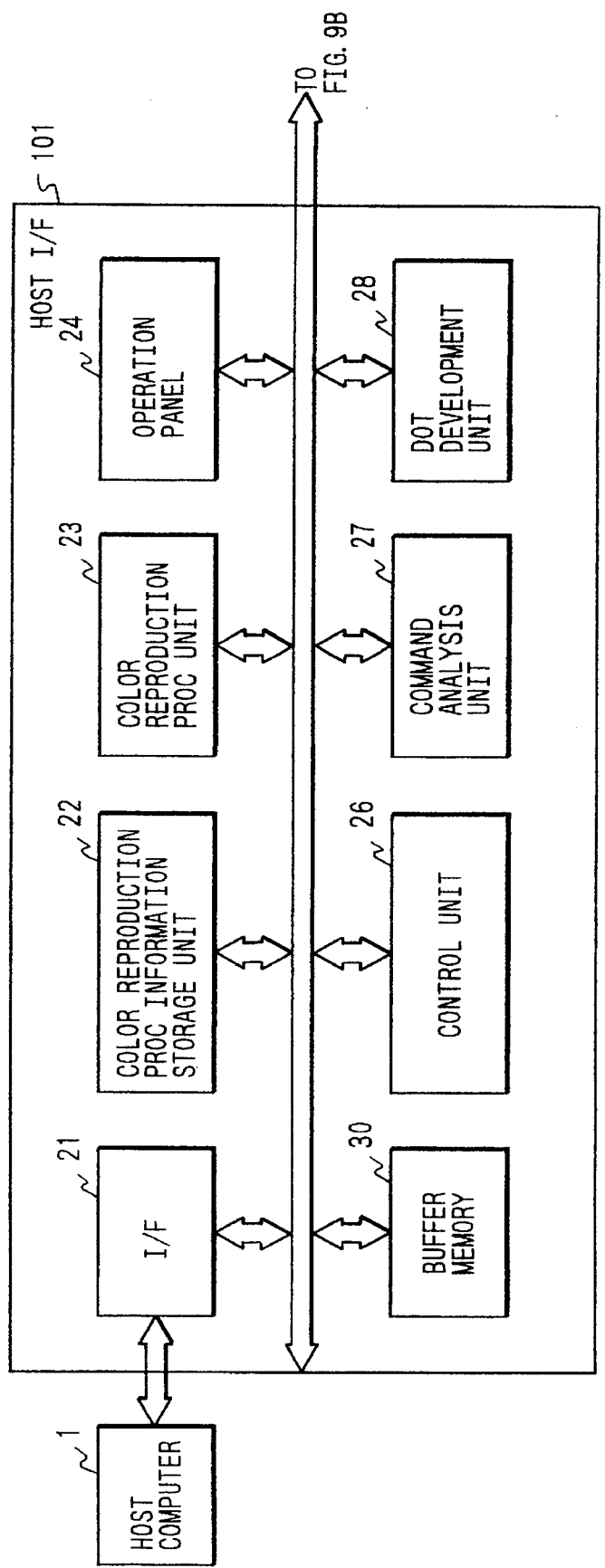

METHOD AND APPARATUS FOR ENHANCING THE SPEED OF COLOR IMAGE PROCESSING

This application is a continuation of application Ser. No. 08/181,167 filed Jan. 13, 1994, which is a continuation of application Ser. No. 07/664,783 filed on Mar. 5, 1991, now abandoned.

BACKGROUND OF THE INVENTION

1. Field of the Invention

The present invention relates to an image processing apparatus and, more particularly to an image processing apparatus for processing image data with color information.

2. Related Background Art

A conventional color printing apparatus was so constructed that a predetermined color reproduction process was performed, and had no any other operation modes to simplify the color reproduction process for printing.

Accordingly, when the predetermined color reproduction process is complicated, there were the following defects especially in processing color image data in the above conventional example:

(1) It takes time to paint because the complicated process must be repeated again and again.

(2) The color tone of the obtained picture often does not conform to the desired one, but requires a color correction process. The desired painting result is usually not obtained once.

Conventionally in this type of apparatus, there was a color correction processing device for an apparatus for recording color information such as an ink jet type or an electrophotography type.

As the color correction method in such an apparatus, a method for a masking process whereby an image on a CRT screen or scanner draft image is color matched with a recording image on a recording medium, or a black generation and under color removal (UCR) method for inking on a recording image, etc. are known.

In the above conventional example, however, a natural picture is mainly processed, and therefore even for an object image, in which characters and graphic forms prepared by a computer are mixed with the natural picture, a color correction process similar to the above-mentioned process is performed. In this case, the conventional example had the defect that the masking, black generation, under color removal, etc. are performed also for characters, which should be recorded all in black, and graphic forms, which should be painted out in a color specified by a color sample.

On the other hand, a technique that detects a black edge in image data which have been input from a reader, and prints unmasked black data on that black edge, is disclosed by U.S. Pat. No. 5,126,838. However, there was room for improvement in the detection method, etc. for the black edge.

Also, a technique that selects whether or not the masking and under color removal process should be performed in accordance with the input command data, is disclosed by U.S. Pat. No. 4,958,219. However, there was room for improvement in the mode selection, etc.

SUMMARY OF THE INVENTION

It is an object of the present invention to provide an image processing apparatus and method that solves the above-mentioned problems at issue, that is, to provide a color image forming apparatus, which has been so constructed that the color reproduction procedure can be simplified as required.

It is a further object of the present invention to provide an image processing apparatus and method with a good color reproducibility.

It is also an object of the present invention to speed up the image process.

It is another object of the present invention to easily draw or paint features of an image.

The other objects and configuration of the present invention will be clarified by the description referring to the drawings below and in the claims.

BRIEF DESCRIPTION OF THE DRAWINGS

FIG. 6B is a flow chart of assistance in explaining the data procedure for under color removal and black generation in the second embodiment;

DESCRIPTION OF THE PREFERRED EMBODIMENTS <First Embodiment>

Figure 1:
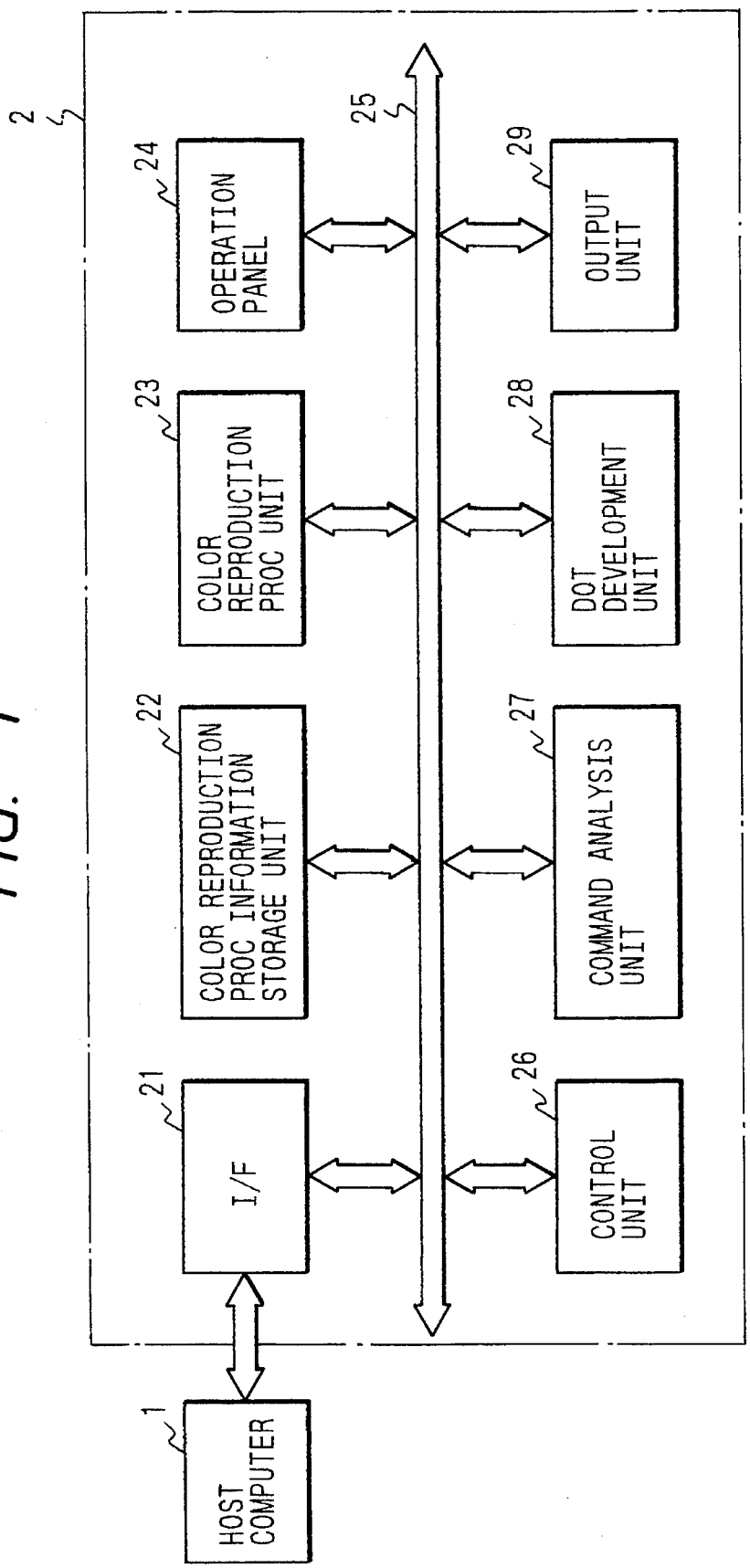
FIG. 1 is a block diagram showing the first embodiment according to the present invention.

FIG. 1 is a block diagram showing the circuit configuration of a printing apparatus in the first embodiment according to the present invention. The printing apparatus according to this embodiment is composed of a host computer 1 and the printing apparatus body 2.

The host computer 1 transmits print data (character data, graphic data, bit map data), print command (paper size, number of papers, etc.), etc. to the printing apparatus body 2 to allow this printing apparatus body 2 to print.

The printing apparatus body 2 has a microprocessor system including a ROM and RAM. That is, the printing apparatus body 2 is equipped with an interface 21 for exchanging data with the host computer 1, a color reproduction process information storage unit 22, in which information such as masking coefficient and gamma correction coefficient, which are required for color reproduction process, are stored, a color reproduction process unit 23 for actually performing the color reproduction process, an operation panel 24 for changing and setting parameters for printing environment, a data bus 25, a control unit 26 for controlling the apparatus in whole, a command analysis unit 27 for analyzing the print data, print command, etc. which have been transmitted from the host computer 1, a dot development unit 28 for developing the color image data, which have been formed through the color reproduction process unit 23, into dot information, and an output unit 29 for changing the data which have been developed in the dot information, into permanent visual image on a recording sheet. An output unit 29 consists of a display device, such as a color monitor, capable of forming a color image, a recording device such as an electrophotographic printer, a transmitting device for transmitting an image through a public circuit and LAN, and the like.

Figure 2:
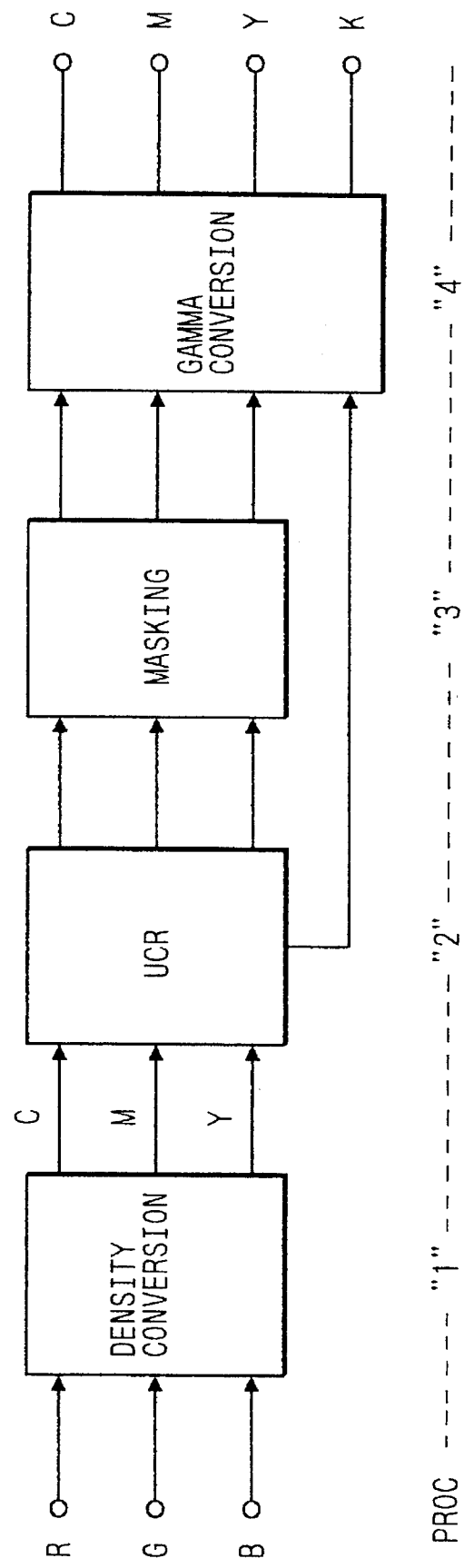
FIG. 2 is a view showing an example of a color reproduction process.

FIG. 2 shows an example of color reproduction process that is performed by the color reproduction process unit 23 shown in FIG. 1. The illuminated process shows a flow which converts signals for three basic primary colors: R(Red), G(Green) and B(Blue) of color into signals for primary colors of coloring material to be printed: C(Cyan), M(Magenta), Y(Yellow) and K(Black).

First, in a process "1", are generated C, M and Y, density information, by performing logarithmic transformation to R, G, and B values, brightness information.

In a process "2", is performed the under color removal process to newly create K on the basis of C, M and Y values which have been obtained in process "1".

In a process "3", is performed masking to remove effects of the mutual extraneous absorption characteristic in C, M and Y toners or ink.

In a process "4", is adjusted (gamma conversion) contrast brightness in accordance with the image.

In a printing apparatus according to this embodiment, color painting is performed by selecting either of the following two items:

① An ordinary color reproduction process mode, which converts the data of three basic primary colors R, G and B into primary colors C, M, Y and K of coloring material of the printing apparatus in accordance with an instruction from the host computer 1 (FIG. 1), and ② "Draft mode" obtained by simplifying the process for an ordinary processing mode.

Figure 3:
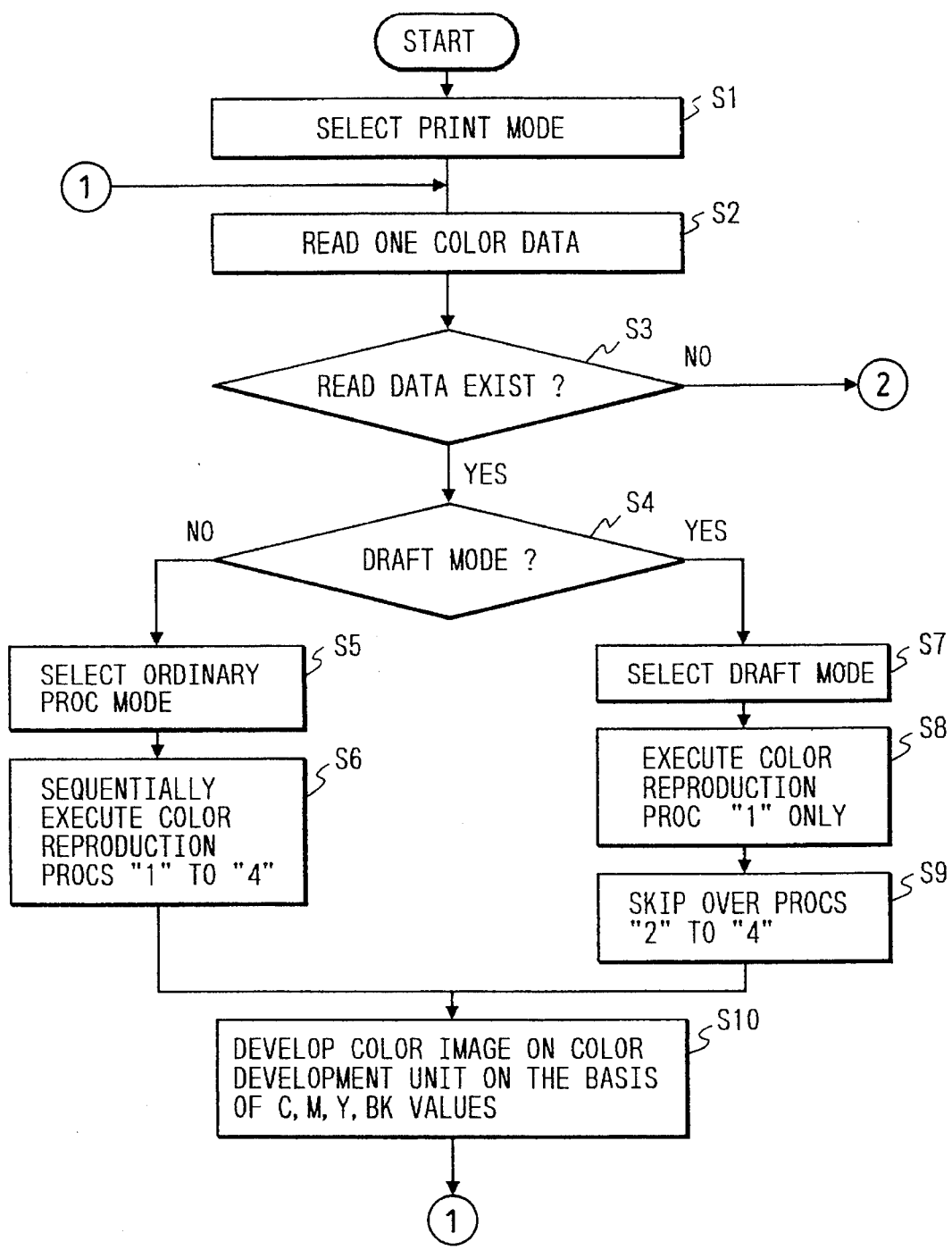
FIG. 3 and FIG. 4 are flow charts showing a process from the time the color data is processed by the selection of a mode until the color print image is output.
Figure 4:
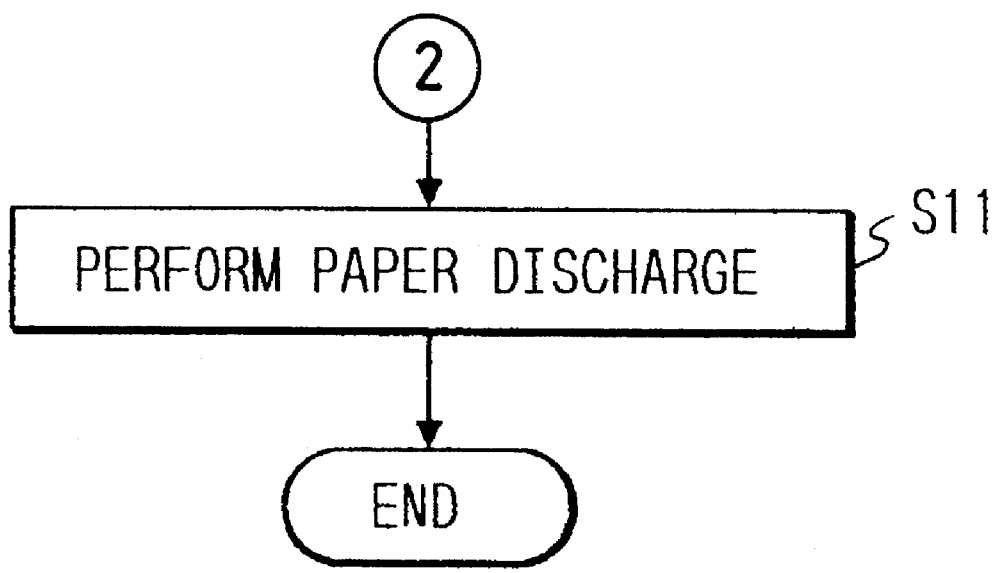

FIGS. 3 and 4 are flow charts showing that the color data is processed by selecting such a mode to output the color printing image.

First in step S1, the mode is selected by the host computer 1, and proceed to step S2.

In step S2, read one color datum (a set of R, G and B datum is regarded as one data), and proceed to step S3.

If there is no data which have been read in step S3, proceed to step S11 to exhaust or discharge paper, and end the process.

If there exist data which have been read in step S3, proceed to step S4 to check the mode selected in step S1.

When an ordinary process mode has been selected (step S5), sequentially execute color reproduction processes "1" to "4" shown in FIG. 2 in step S6, and proceed to step S10.

On the other hand, when the draft mode has been selected (step S7), execute only a color reproduction process "1" shown in FIG. 2 in step S8, and proceed to step S9 skipping over processes "2" to "4", and then proceed to step S10.

In step S10, develop a color image on a dot development unit 28 (FIG. 1) on the basis of C, M, Y and K values obtained by the color reproduction process, and further return to step S2 to repeat the process until the color data to be read are out.

As mentioned above, the printing process can be simplified by skipping over the color reproduction process.

The above-mentioned processes "1" to "4" are performed by means of computer software, of which the color reproduction process unit 23 is composed. In such a case, the unnecessary process can be omitted to speed up the process by selecting the above-mentioned draft mode.

Instead of using software, each of processes "1" to "4" can be carried out using a well-known density conversion circuit, under color removal (UCR) circuit, masking circuit, and gamma conversion circuit, and in the case of the draft mode, the data may pass through the under color removal circuit, masking circuit, and gamma conversion circuit.

An example of the output unit 29 according to this embodiment will be explained referring to FIG. 8. A printer interface 701 is composed of a frame memory 702 for storing image data, a CPU 703 for reading and writing in memory 702 or notifying the control unit 26 of end in transferring data and errors, and the like.

Image data stored in the frame memory 702 are transmitted to a color printer 704 to modulate the pulse width in a PWM (Pulse Width Modulation) circuit 778. A scanner 711 has a laser output unit for converting an image signal from the PWM circuit 778 to light signal, a polygon mirror 712, which is a polyhedron (such as an octahedron), a motor (not shown) for rotating this mirror 712, f/θ lens (image formation lens) 713, etc.

Numeral 714 is a reflecting mirror for changing the optical path of laser light, and numeral 715 is a photosensitive drum. Laser light emitted from a laser output unit is reflected on the polygon mirror 712, and linearly masterscans the surface of a photosensitive drum 715 through a lens 713 and a mirror 714 to form a latent image corresponding to the draft (original) image.

Numeral 711 is a primary electrifier (charger), 718 is a total exposure lamp, and 723 is a cleaner unit for collecting residual toner which has not been transferred. Numeral 724 is a before-transfer electrifier (charger). These members are placed around the photosensitive drum 715.

A development counter unit 726 develops an electrostatic latent image formed on the surface of the photosensitive drum 715 by laser exposure. Developing sleeves 731Y, 731M, 731C and 731Bk are in contact with the photosensitive drum 715 for direct developing. Toner hoppers 730Y, 730M, 730C and 730Bk hold spare toner, and a screw 732 transports developer. The development counter unit 726 consists of these sleeves 731Y to 731Bk, toner hoppers 730Y to 730Bk and screw 732, and these members are placed around a rotating shaft P of the development counter unit.

To form a yellow toner image, for example, perform yellow toner development at the position in this figure. To form a magenta toner image, rotate the development counter unit 726 on a shaft P of the figure to place the developing sleeve 731M within the magenta development counter at a position in contact with a photosensitive body 715. Cyan and black development are similarly performed.

A transfer drum 716 transfers a toner image formed on the photosensitive drum 715 on paper, and an actuator plate 719 detects the moving position of a transfer drum 716. A position sensor 720 detects that the transfer drum 716 has moved to the home position by approaching to the actuator plate 719. Numeral 725 is a transfer drum cleaner, 727 is a paper hold-down roller, 728 is a deelectrifier (discharger), and 729 is a tranfer electrifier. These members 719, 720, 725, 727 and 729 are placed around the transfer roller 729.

On the other hand, numerals 735 and 736 are feed paper cassettes for housing paper (cut sheets), and 737 and 738 are feed paper rollers for feeding paper from cassettes 735 and 736. Numerals 739, 740 and 741 are timing rollers for timing feeding and conveying paper. Paper, which has been fed and conveyed through these rollers, is guided by a paper guide 749, and is wound around the transfer drum 716 while its tip is being held by a gripper as mentioned later, and then shifts to the image forming process.

A drum driving motor 550 synchronously rotates the photosensitive drum 715 and the transfer drum 716. A peel pawl 750 removes the paper from the transfer drum 716 after completing the image forming process. A conveyance belt 742 conveys the removed paper. An image fixing unit 743 fixes the paper conveyed by the conveyance belt 742, and has a pair of thermal pressure rollers 744 and 745.

In the above-mentioned embodiments, four processes the color reproduction process have been cited as examples, but it is needless to say that it is applicable to other processes.

In the above-mentioned "Draft mode", an example, in which only a process "1" (density conversion) is performed, was described. However, when only processes "1" and "2" are performed, when only processes "1" and "3" are performed, and in some other cases, the invention is applicable to all combinations of conceivable processes by selecting the process to be skipped over.

Although a selection of print mode from the host computer has been described in the above-mentioned embodiment, it is also possible to select the print mode from the operation panel 24 for the printing apparatus.

A color image forming apparatus according to this embodiment can be applied to an output device capable of forming a color image such as a color laser beam printer, color ink jet printer, and color thermal transfer printer. Especially the ink jet printer includes a so-called bubble jet printer using such a type of head as to discharge liquid droplet by film boiling using heat energy. A printer for printing binary data per picture element (pixel) or multi-value data may be used.

As described above, according to the present invention, (1) The overall processing time can be greatly shortened by simplifying a complicated image process.
(2) This can be used to grasp the outline of a painting result.

<Second Embodiment>

Figure 5:
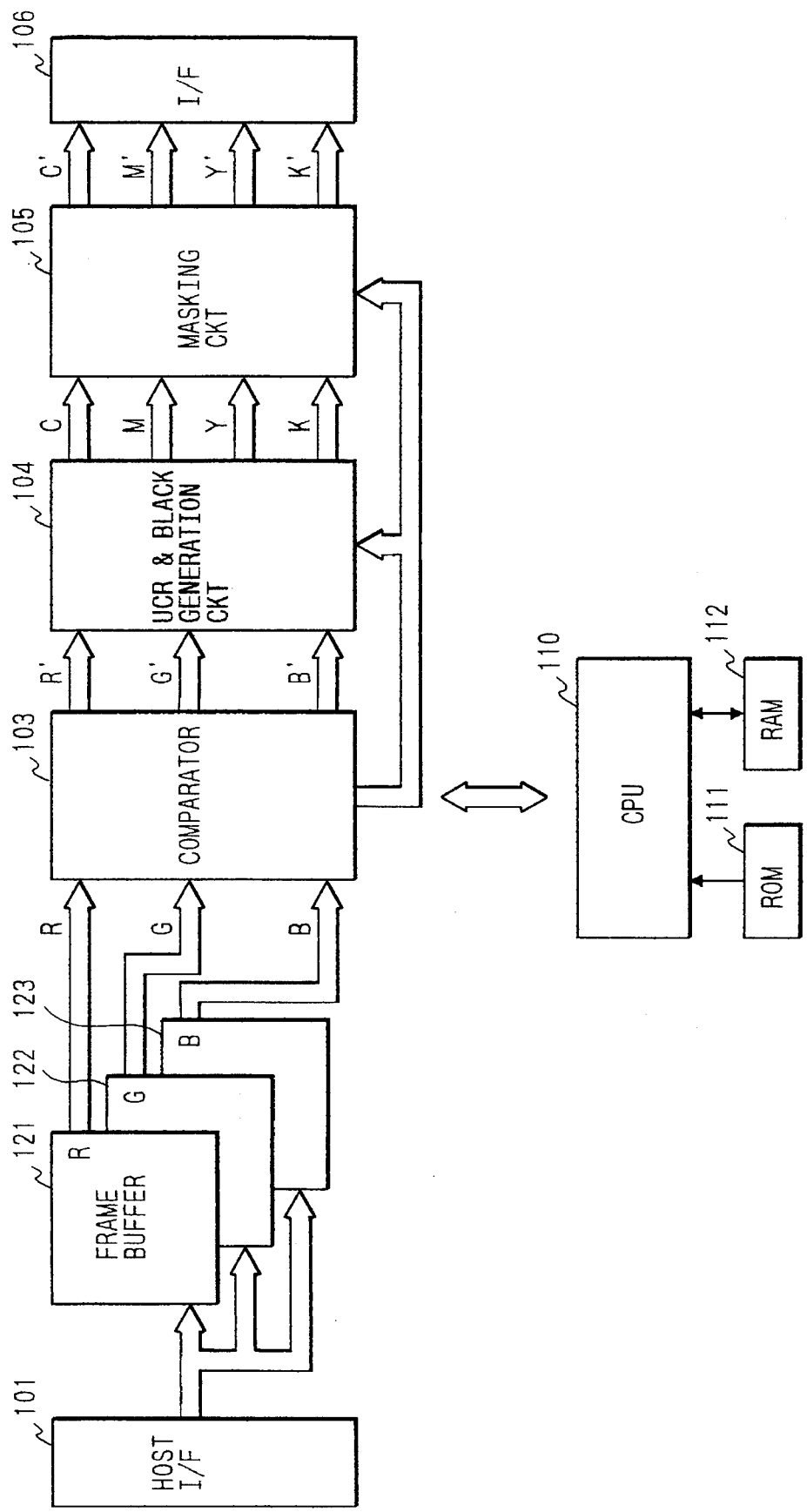
FIG. 5 is a block diagram showing the configuration of the second embodiment of an image processing apparatus according to the present invention.

FIG. 5 is a block diagram showing the configuration of the second embodiment of an image processing device according to the present invention. In FIG. 5, a host interface (hereinafter called "host I/F") 101 receives color gradation data, in which characters, graphic forms and natural pictures prepared by a host device (not shown) are mixed, from the host device. A frame buffer 121 to 123 store the color gradation data received from the host I/F 101 into R (red), G (green) and B (blue) each for one screen by colors.

A comparator 103 reads each color gradation data stored in the frame buffers 121 to 123 for each picture element to compare with predetermined values. When the values read from the frame buffers 121, 122 and 123 coincide with the predetermined values, the comparator 103 transmits a signal to an under color removal (UCR) and black generation circuit 104 as mentioned later and a masking circuit 105 as mentioned later to notify the later stage of the coincidence. When not coincident, no signal will be transmitted to the later stage.

When it has not received a signal showing that the values read from the comparator 103 coincide with the predetermined values, the under color removal and black generation circuit 104 generates data for four colors: C, M, Y and K from each of R, G and B color gradation data, which has been read from the comparator 103, by using the following method.

First, obtain complements on the read RGB data as follows:

$$C_0=\bar{R}, M_0=\bar{G}, Y_0=\bar{B}$$

Further obtain the minimum values for $C_0$, $M_0$ and $Y_0$, and regard this as $K_0$:

$$K_0=\min(C_0, M_0, Y_0)$$

Multiply $K_0$ by a predetermined factor $\alpha$, and deduct this from $C_0$, $M_0$ and $Y_0$, and then regard as C, M and Y respectively:

$$C=C_0-\alpha \times K_0, M=M_0-\alpha \times K_0,$$

$$Y=Y_0-\alpha \times K_0$$

Similarly, multiply K' by a factor $\beta$ beforehand, and regard this as K:

$$K=\beta \times K_0$$

Each of C, M, Y and K gradation data is determined by the foregoing, and is output to a masking circuit 105 for performing color correction in a later stage.

On the other hand, when it has received a signal showing that the values read from the comparator 103 coincide with the predetermined values, the under color removal and black generation circuit 104 outputs each of C, M, Y and K gradation data to the masking circuit 105 at a later stage, assuming as follows:

$$C=\bar{R}, M=\bar{G}, Y=\bar{B}, K=0$$

The masking circuit 105 for performing color correction receives each of C, M, Y and K gradation data from the under color removal and black generation circuit 104. When it has not received a signal showing that the values read from the comparator 103 coincide with the predetermined values, the masking circuit performs color correction by the following operation to obtain masked signals for C', M', Y' and K'. That is, $$Y'=a \times Y+b \times M+c \times C$$

$$M'=d \times Y+e \times M+f \times C$$

$$C'=g \times Y+h \times M+i \times C$$

$$K'=j \times K$$

where Y, M, C and K are a value for each color read from the under color removal and black generation circuit 104 respectively, and Y', M', C' and K' are a value for each color after correction resepectively. a, b, c, d, e, f, g, h, i, and j are predetermined color correction coefficients. In the second embodiment, primary color correction has been performed, but color correction more than primary, that is, non-linear masking may be performed.

When it has received a signal showing that the values read from the comparator 103 coincide with the predetermined values, the masking circuit outputs Y', M', C' and K' values which were predetermined in accordance with the input Y, M, C and K values. Assuming a number of bits for the color gradation data to be stored in the frame buffers 121 to 123, for example, as 8 bits, when the value read from these frame buffers 121, 122 and 123 is R=G=B=0, record only K (black) in the recording device.

If the comparator 103 is so set beforehand that a signal is given to the under color removal and black generation circuit I 04 and masking circuit 105 when R=G=B=0, the masking circuit 105 receives a signal from the comparator 103 when the values read from the frame buffers 121, 122 and 123 are R=G=B=0. Since C=M=Y=255 and K=0 are received as an input signal from the under color removal and black generation circuit 104 at this time, it will be possible to record only K (black) if it is so set beforehand that M'=Y'=0 and K=255 are output when both conditions meet.

Since the R.G.B data in the comparator 103 are synchronized with a signal showing that the value read from the comparator 103 coincides with the predetermined value, the R.G.B data will be adequately delayed.

An interface (I/F) 106 is interface means for transmitting each of Y', M', C' and K' color values, to a printing device, which have been output from the masking circuit 105. A CPU 110 controls the entire apparatus. A ROM 111 stores a program, etc. based on the flow charts in FIGS. 6A to 6C as mentioned later, and a RAM 112 is used as a work area for various programs.

The operation in the second embodiment will be explained below.

Figure 6A:
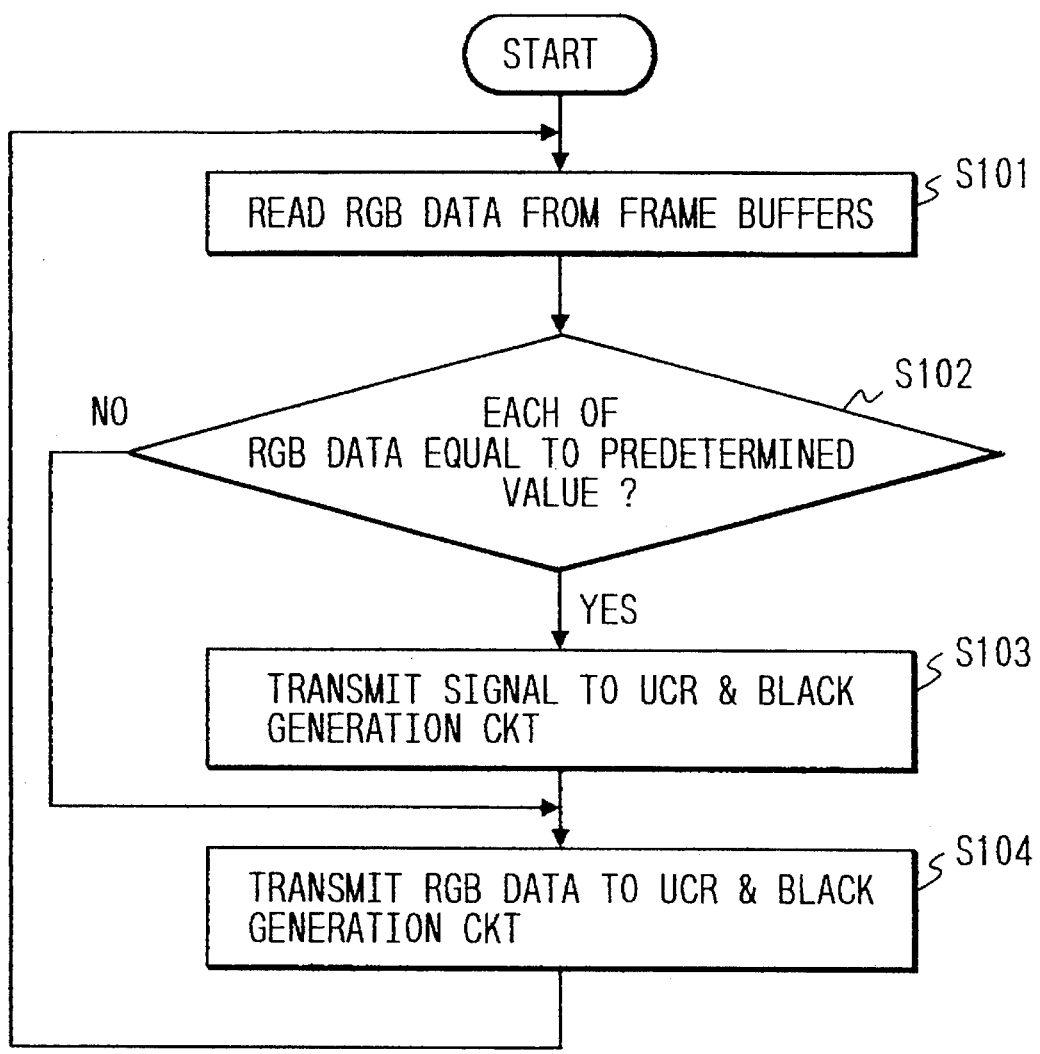
FIG. 6A is a flow chart of assistance in explaining the data procedure for comparison in the second embodiment.

FIG. 6A is a flow chart of assistance in explaining the data procedure for comparison based on the second embodiment.

It is assumed that each of R, G and B data has already been stored in the frame buffers 121 to 123 through the host I/F 101.

First, the comparator 103 reads (step S101) each of R, G and B data from the frame buffers 121, 122 and 123. Then each of R, G and B data, which have been read in step S101, is compared with the predetermined values (step S102). As a result, after coincidence has been confirmed, the process proceeds to step S103, and when, on the other hand, coincidence can not be confirmed, the process proceeds to step S104.

In step S103, a signal showing that the values read from the frame buffers 121, 122 and 123 in step S101 coincide with the predetermined values, is transmitted to the under color removal and black generation circuit 104 and masking circuit 105. The process proceeds to step S104, and each of R, G and B data, which has been read in step S101, is transmitted to the under color removal and black generation circuit 104. The process returns to step S101 again to repeat the above operations.

FIG. 6B is a flow chart of assistance in explaining the data procedure for the under color removal and black generation in the second embodiment.

First, each of R, G and B data is read from the comparator 103 by the under color removal and black generation circuit 104 (step S111). Then it is checked (step S112) whether or not a coincidence signal showing that the values read from the frame buffers 121, 122 and 123 coincide with the predetermined values, has been input from the comparator 103.

As a result, when it is confirmed that the coincidence signal has been input, the process proceeds to the next step S113. When it is confirmed that a non-coincidence signal has been input, the process skips to step S114. In step S103, obtain complements on each of the input R, G and B data, regard as C, M and Y values respectively, and further set the K value to 0. The process proceeds to the next step S115.

On the other hand, perform the under color removal and black generation by using the above-mentioned method in step S114 to perform a process for obtaining each of C, M, Y and K values. In step S115, C, M, Y and K values obtained in step S113 or step S114 are transmitted to the masking circuit 105 to correct the color. The process returns to step S111 again to repeat the above operations.

When the values read from the frame buffers 121, 122 and 123 in step S101 coincide with the predetermined values in the comparator 103 from the above process, the under color removal and black generation are not performed, but Y, M, C and K are determined in accordance with a specified algorithm.

Figure 6C:
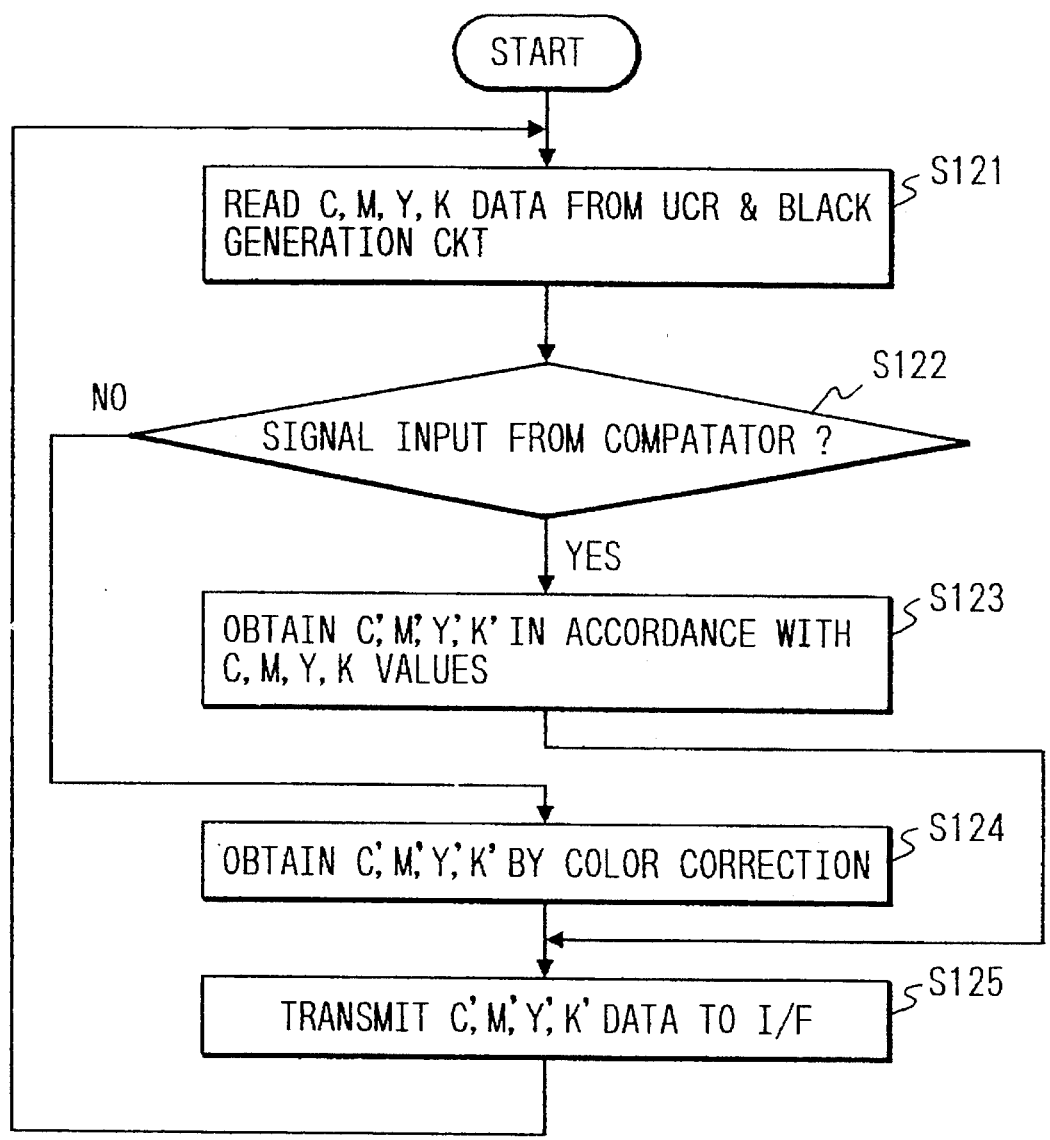
FIG. 6C is a flow chart of assistance in explaining the data procedure for color correction using CPU10 in the second embodiment.

FIG. 6C is a flow chart of assistance in explaining the data procedure for the color correction using the CPU 110 in the second embodiment.

First, each of C, M, Y and K data is read from the under color removal and black generation circuit 104 by the masking circuit 105 (step S121). Then it is checked (step S122) whether or not a coincidence signal showing that the data values read from the frame buffers 121, 122 and 123 coincide with the predetermined values, has been input from the comparator 103.

As a result, when it is confirmed that the coincidence signal has been input, the process proceeds to the next step S123. When it is confirmed that a non-coincidence signal has been input, the process skips to step S124. First, in step S123, the values predetermined by each of the input C, M, Y and k data values are set to C', M', Y' and K' values respectively. The process proceeds to step S125.

On the other hand, in step S124, C', M', Y' and K' values are obtained, which have been color corrected in the masking circuit 105 by using the above-mentioned method. In step S125, each of C', M', Y' and K' values obtained in the above step S123 or step S124 is transmitted to the I/F 106. The process returns to step S121 again to repeat the above operations.

For characters, which should be originally recorded all in black, and graphic forms, which should be painted out in a color specified by a color sample, the under color removal, black generation and color correction (masking) are not performed, but can be performed for natural pictures.

As explained above, an unnecessary image process can be eliminated in accordance with the input image according to the second embodiment.

The image from the I/F 106 is output to a printer, CRT, etc., or an external communication function through a public circuit or digital circuit can be added by connecting a communication process circuit to the I/F 106.

Figure 8:
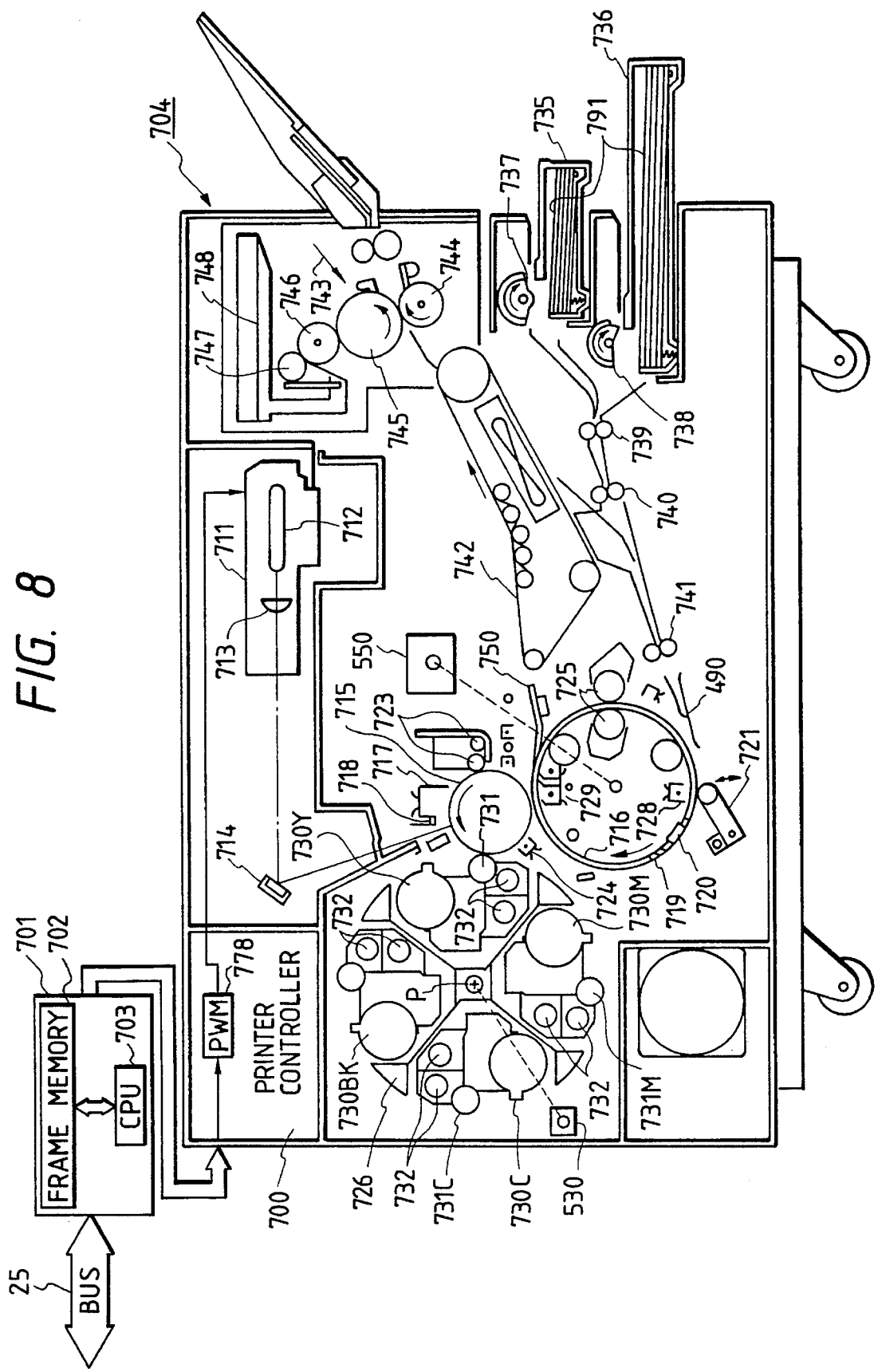
FIG. 8 is a view showing an example of a printer according to the present invention.

For the printer, a printer in FIG. 8 can be used like the above-mentioned embodiment.

The above process may be performed using a computer software without providing a special hardware.

<Third Embodiment>

The third embodiment will be explained.

Figure 7:
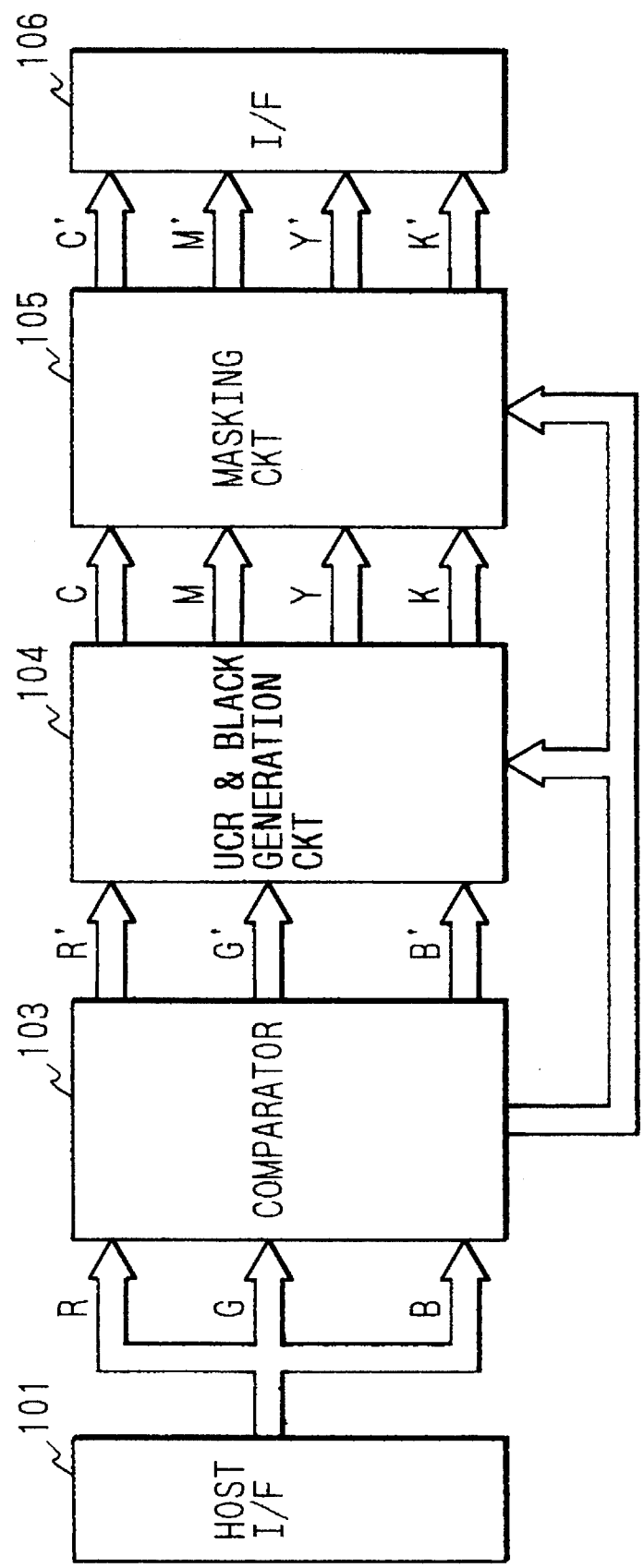
FIG. 7 is a block diagram showing the configuration of the third embodiment of an image processing apparatus according to the present invention.

FIG. 7 is a block diagram showing the configuration of the third embodiment of an image processing apparatus according to the present invention. In FIG. 7, the frame buffers 21, 22 and 23 are omitted which are shown in the second embodiment in FIG. 5. That is, a configuration is shown in which color gradation data for one screen for each of R, G and B are prepared on the host device side and are input into the apparatus through the host I/F 101 for each picture element in the order of R, G and B.

The third embodiment has the same configuration as the second embodiment except frame buffers 121, 122 and 123, and the same numbers are assigned. In addition, since the process and effect in the comparator 103 and after are also the same as in the second embodiment, the explanation is omitted.

This embodiment is effective not for such a laser beam printer with high image forming speed as shown in FIG. 8, but for the above bubble jet type printer, for example, which prints at a comparatively low speed. In this embodiment, no frame buffer is required for a printer or printer interface, but only a buffer for several lines at most is required. Therefore the circuit configuration can be simplified to reduce the cost.

As mentioned above, an unnecessary image process can be eliminated in accordance with the input image, and an image process suitable for the feature of an input image can be performed at high speed.

<Fourth Embodiment>

Figure 9B:
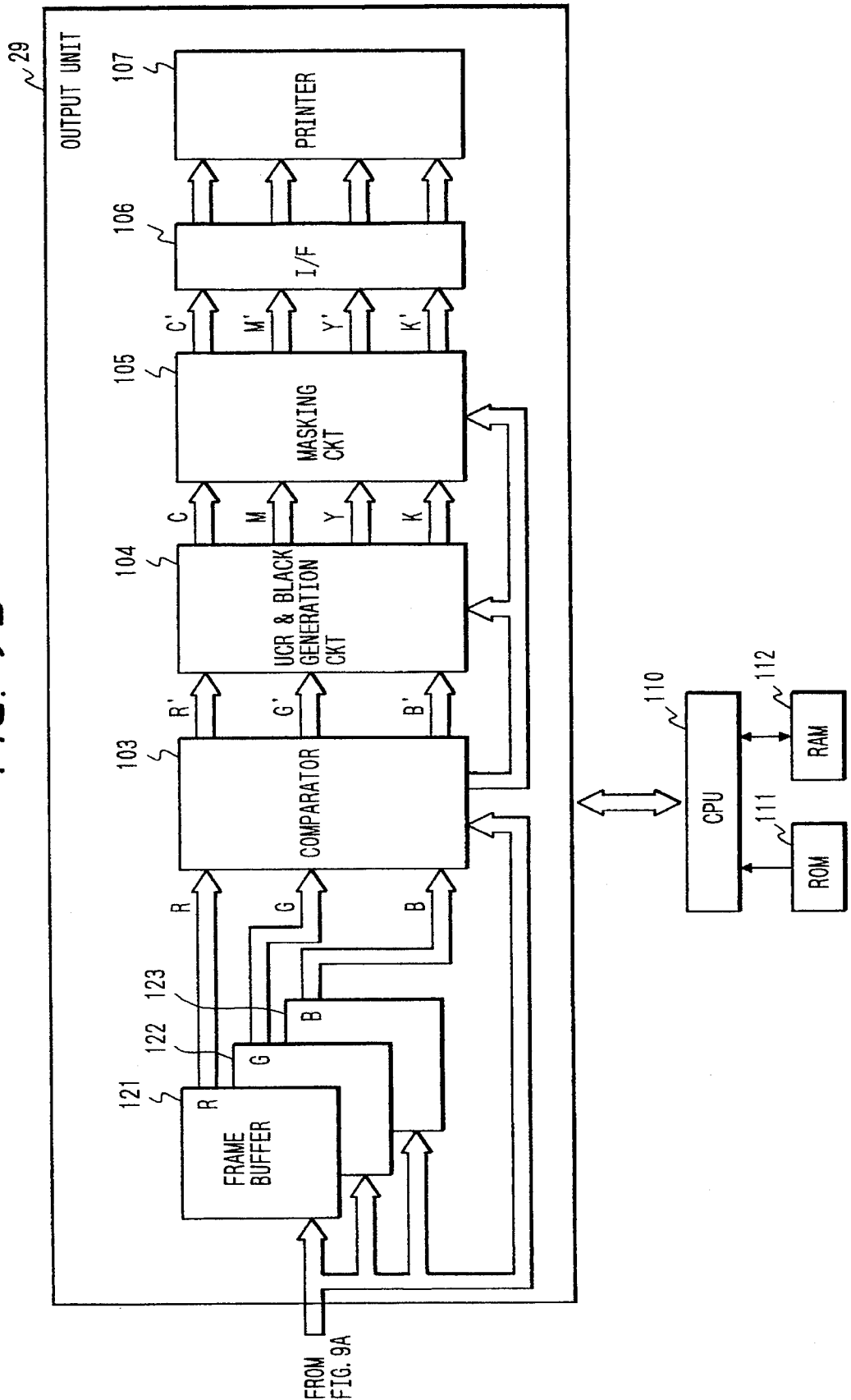
FIG. 9, consisting of FIGS. 9A and 9B, is a block diagram showing the configuration of the fourth embodiment.

The host I/F 101 in the above second embodiment can have the same configuration as in the first embodiment. FIG. 9 shows such a configuration. In the same configurations as in FIGS. 1 and 5, the same numbers are assigned. A printer 107 is for reproduction of an image.

The operation of an image processing apparatus in FIG. 9 will be explained.

Character data, graphic data (painting command), and bit map data (image data for each picture element read by a scanner, for example, or prepared by a computer graphic) are transmitted from the host computer 1 to the host I/F. The data are described in PDL (Page Description Language) such as Post Script (trademark).

Data transmitted from the host computer 1 is accumulated in a buffer memory 30, and it is identified in a command analysis unit 27 whether the data is (i) character data or graphic data, or (ii) bit map data. This identification data is input into the comparator 103 through a data bus 25.

The identification data is output corresponding to the picture element to be read from the frame buffers 121 to 123, and when it is read from the buffer by raster scanning, for example, it is output by raster scanning. For this reason, the command analysis unit has a bit map memory for one screen, and stores the identification data for each picture element beforehand. When overwriting in PDL with such a configuration, the identification data for an image, which becomes a top when it is changed into a visible image, can be transmitted to the comparator 103.

In the comparator 103, when the above identification data is (i) character data or graphic data, the same process as in the second embodiment is performed, but in the case of bit map data, a process using the under color removal and black generation circuit 104 or masking circuit 105 is performed even if the image data is equal to the predetermined value (e.g., R=G=B=D). This is because if the under color removal and masking are not performed only for the black picture element of the natural picture, the color balance will be lost and the picture element portion is likely to become unnatural in the entire image, and it should be prevented.

The present invention is not limited to the above embodiments, but can be applied by modifying in various ways within the scope of the claims.

What is claimed is:

1. An image processing apparatus, comprising:
   judgment means which judges whether or not input color image data is a specific value;
   color correction means which performs a calculation by using the input color image data in order to correct a color represented by the input color image data; and
   control means which controls color correction by said color correction means in accordance with a judgment by said judgment means,
   wherein said control means is responsive to the input image data being judged by said judgment means to be the specific value to not perform the calculation for color correction and to produce output data faster than when the input image data is judged not to be the specific value.

2. The image processing apparatus according to claim 1, wherein said judgement means judges whether or not the input color image data represents a specific color.

3. The image processing apparatus according to claim 2, wherein said specific color is black.

4. The image processing apparatus according to claim 1, wherein said color correction means performs a masking process.

5. The image processing apparatus according to claim 1, wherein said color correction means performs a gamma conversion.

6. The image processing apparatus according to claim 1, wherein the calculation for color correction is implemented by computer software.

7. The image processing apparatus according to claim 1, wherein the calculation for color correction is implemented by hardware.

8. An apparatus according to claim 1, further comprising second color correction means which performs a second color correction different from said color correction.

9. An image processing method, comprising the following steps:
   a judgment step which judges whether or not input color image data is a specific value;
   a color correction step which performs a calculation by using the input color image data in order to correct a color representedby the input color image data; and
   a selection step which selects either a first mode in which the calculation for color correction is performed or a second mode in which the calculation for color correction is not performed in accordance with a judgment in said judgment step,
   wherein said image processing method produces output data faster in said second mode than in said first mode.

10. The image processing method according to claim 9, wherein said judgement step judges whether or not an input image data represents a specific-color.

11. The image processing method according to claim 10, wherein said specific color is black.

12. The image processing method according to claim 9, wherein said color correction step performs masking.

13. The image processing method according to claim 9, wherein said color correction step performs gamma conversion.

14. The image processing method according to claim 9, wherein the calculation for color correction is implemented by computer software.

15. The image processing method according to claim 9, wherein the calculation for color correction is implemented by hardware.

16. A method according to claim 9, further comprising a second color correction step which performs a second color correction different from the color correction in said color correction step.

17. An image processing method, comprising the following steps:
   a development step which analyzes received command data and develops an image;

a judgment step which judges, in response to said command data, whether or not an image which is to be developed in said development step is represented by image data for each picture element of the image; and a selection step which selects either a first mode in which a calculation for color correction of the image is performed or a second mode in which the calculation for color correction of the image is not performed in accordance with a judgment in said judgment step.

18. The image processing method according to claim 17, wherein said judgment step judges whether said command data indicates that the image is represented by character data, graphic data or bit map data.

19. An image processing method comprising the following steps:

a development step which analyzes a received command data and develops an image;

a judgment step which judges whether or not an image developed in accordance with said command data is represented by image data, for each picture element;

a selection step which selects either a first mode for performing calculation for color correction or a second mode for not performing calculation for color correction in accordance with the judgment in said judgment step; and a storage step to store a result further judged in said judgment step.

20. The image processing method according to claim 17, wherein said selection step selects the first mode when an image to be developed has been judged to be image data for each picture element.

21. The image processing method according to claim 17, wherein the calculation for color correction includes a masking process.

22. The image processing method according to claim 17, wherein the calculation for color correction includes a gamma conversion process.

23. The image processing method according to claim 17, wherein the calculation for color correction is performed by computer software.

24. A method according to claim 17, further comprising a second color correction step which performs a second color correction based on a selected result in said selection step, the second color correction being different from the color correction in said color correction step.

25. The image processing method according to claim 17, wherein the calculation for color correction is performed by hardware.

26. An image processing method, comprising the following steps:

a mode setting step which manually sets one of a high-speed process mode and a normal process mode, the normal process mode performing a calculation for color correction using input color image data in order to perform color correction represented by the input color image data and the high-speed process mode not performing the calculation for color correction; and a processing step for processing the input color image data in accordance with the mode set in said mode setting step, said processing step producing output data faster in the high-speed process mode than in said normal process mode.

27. A method according to claim 26, wherein said mode setting step is performed by an external apparatus.

28. A method according to claim 26, wherein the calculation for color correction performs a masking process.

29. A method according to claim 26, wherein the calculation for color correction performs an under color removal process.

30. A method according to claim 26, wherein the calculation for color correction performs a gamma conversion process.

31. A method according to claim 26, wherein the calculation color correction is implemented by computer software.

32. A method according to claim 26, wherein the calculation for color correction is implemented by hardware.

33. A method according to claim 26, further comprising a color correction step which performs a second color correction different from the color correction processed in said processing step.

* * * * *

UNITED STATES PATENT AND TRADEMARK OFFICE
CERTIFICATE OF CORRECTION

PATENT NO.  : 5,457,549
DATED       : October 10, 1995
INVENTOR(S) : SHUICHI KUMADA, ET AL.

It is certified that error appears in the above-indentified patent and that said Letters Patent is hereby corrected as shown below:

COLUMN 1

Line 30, "not obtained once" should read --not achieved the first time--.

COLUMN 2

Line 11, "description referring" should read --following detailed description of the preferred embodiments referring--;

Line 45, "<First" should read --¶ <First--; and

Line 57, "RAM." should read --a RAM.--.

COLUMN 4

Line 29, "master-" should read --raster- --; and

Line 63, "tranfer" should read --transfer--.

COLUMN 5

Line 14, "processes" should read --processes of--.

COLUMN 7

Line 5, "circuit I 04" should read --circuit 104--.

COLUMN 8

Line 26, "k" should read --K--.

UNITED STATES PATENT AND TRADEMARK OFFICE
CERTIFICATE OF CORRECTION

PATENT NO. : 5,457,549
DATED : October 10, 1995
INVENTOR(S) : SHUICHI KUMADA, ET AL.

It is certified that error appears in the above-indentified patent and that said Letters Patent is hereby corrected as shown below:

<u>COLUMN 10</u>

Line 36, "representedby" should read --represented by--;

Line 45, "judgement" should read --judgment--; and

Line 46, "specific-color" should read --specific color--.

Signed and Sealed this

Twelfth Day of March, 1996

Attest:

BRUCE LEHMAN

Attesting Officer

Commissioner of Patents and Trademarks